(12) United States Patent
Yamazaki

(10) Patent No.: US 9,239,505 B2
(45) Date of Patent: Jan. 19, 2016

(54) ELECTROPHORETIC DISPLAY APPARATUS AND ELECTRONIC APPARATUS

(71) Applicant: Seiko Epson Corporation, Tokyo (JO)

(72) Inventor: Katsunori Yamazaki, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/486,004

(22) Filed: Sep. 15, 2014

(65) Prior Publication Data

US 2015/0077836 A1    Mar. 19, 2015

(30) Foreign Application Priority Data

Sep. 18, 2013    (JP) .................... 2013-192665

(51) Int. Cl.
| | |
|---|---|
| *G02B 26/00* | (2006.01) |
| *G09G 3/34* | (2006.01) |
| *G02F 1/167* | (2006.01) |
| *G02F 1/1335* | (2006.01) |
| *G09G 3/36* | (2006.01) |
| *G02B 26/02* | (2006.01) |
| *G02F 1/13* | (2006.01) |

(52) U.S. Cl.
CPC .............. *G02F 1/167* (2013.01); *G02B 26/026* (2013.01); *G02F 1/133524* (2013.01); *G09G 3/344* (2013.01); *G09G 3/36* (2013.01); *G02B 26/02* (2013.01); *G02F 1/1326* (2013.01); *G02F 1/133502* (2013.01); *G02F 2001/133562* (2013.01); *G02F 2001/133565* (2013.01); *G02F 2001/1672* (2013.01); *G09G 3/34* (2013.01)

(58) Field of Classification Search
CPC . G02F 1/133; G02F 1/1326; G02F 1/133502; G02F 1/133524; G02F 1/167; G02F 2001/133565; G02F 2001/1672; G02F 2001/133562; G02F 2202/01; G02F 2203/01; G09G 3/34; G09G 3/344; G09G 3/36; G02B 26/02; G02B 26/026
USPC .................. 359/296, 245, 228, 253; 345/107; 430/31, 32; 349/122
See application file for complete search history.

(56) References Cited

U.S. PATENT DOCUMENTS

| | | | | |
|---|---|---|---|---|
| 7,025,647 | B2 * | 4/2006 | Miyazawa | .......... H01L 51/0003 313/504 |
| 7,477,442 | B2 * | 1/2009 | Iwamatsu | ............... G02F 1/167 345/107 |
| 7,495,821 | B2 * | 2/2009 | Yamakita | ................ G02F 1/167 359/290 |

FOREIGN PATENT DOCUMENTS

| | | |
|---|---|---|
| JP | 2003-35917 A | 2/2003 |
| JP | 2004-347921 A | 12/2004 |
| JP | 2013-07985 A | 1/2013 |

* cited by examiner

*Primary Examiner* — Loha Ben
(74) *Attorney, Agent, or Firm* — ALG Intellectual Property, LLC

(57) ABSTRACT

In at least one embodiment of the disclosure, an electrophoretic display apparatus includes a first substrate. A refractive index variation layer is arranged so as to oppose the first substrate. An electrophoretic layer is arranged between the first substrate and the refractive index variation layer. A refractive index of the refractive index variation layer increases as it recedes away from the electrophoretic layer in a thickness direction of the electrophoretic layer.

17 Claims, 6 Drawing Sheets

ELECTROPHORETIC DISPLAY APPARATUS AND ELECTRONIC APPARATUS

CROSS-REFERENCE

The present application claims priority from Japanese Patent Application No. 2013-192665 filed on Sep. 18, 2013, which is hereby incorporated by reference in its entirety.

BACKGROUND

An electrophoretic display apparatus acquired by pouring dispersion liquid in which electrophoretic particles are dispersed into areas divided by walls which are formed between a pair of substrates are known (for example, refer to JP-A-2013-7985).

However, when a certain pixel is focused as a target pixel, the brightness of the target pixel changes due to the colors (reflectance) of peripheral pixels, and thus there is a problem in that display irregularity occurs.

SUMMARY

In at least one embodiment, an electrophoretic display apparatus and an electronic apparatus capable of acquiring excellent display quality by suppressing display irregularity may be obtained.

The inventors, as a result of earnest research, have found that a reason for change in the brightness of a target pixel due to the colors (reflectance) of peripheral pixels is that approximately 60% of reflection light in the peripheral pixels is reflected in a substrate surface and then radiated to the target pixel, and thus the target pixel reflects the light. That is, if the peripheral pixels are black, the amount of light which is radiated to the target pixel decreases, and thus the target pixel becomes dark, and, if the peripheral pixels are white, the amount of light which is radiated to the target pixel increases, and thus the target pixel becomes bright. That is, knowledge in that optical crosstalk causes the display irregularity to occur has been acquired. Embodiments are based on this research.

According to at least one embodiment, an electrophoretic display apparatus includes a first substrate, an electrophoretic layer that is arranged on one surface side of the first substrate, a refractive index variation layer that is arranged on the electrophoretic layer. The refractive index variation layer is configured to change such that a refractive index gradually increases while receding from the electrophoretic layer in a thickness direction of the electrophoretic layer.

In the electrophoretic display apparatus according to this embodiment, when light at a greater than a critical angle in light scattered in the electrophoretic layer passes through the refractive index variation layer, light can be bent in a normal line direction (thickness direction of the electrophoretic layer). Therefore, it is possible to reduce light which is totally reflected and radiates adjacent pixels when light does not pass through the refractive index variation layer. Therefore, display irregularity due to optical crosstalk may be prevented from occurring, and thus it is possible to perform display with a higher quality.

According to this embodiment, in the refractive index variation layer, the refractive index may continuously change.

In the electrophoretic display apparatus, since the refractive index of the refractive index variation layer continuously changes, a boundary surface is not generated in the refractive index variation layer. Therefore, light is not reflected in the boundary surface in the refractive index variation layer. Therefore, light passes through the refractive index variation layer, and is effectively taken to the outside.

According to the aspect, the electrophoretic display apparatus may further include a second substrate that interposes the electrophoretic layer between the first substrate and the second substrate, and the refractive index variation layer may be arranged between the electrophoretic layer and the second substrate.

In the electrophoretic display apparatus, it is possible to cause light from the electrophoretic layer to be efficiently incident into the refractive index variation layer.

According to this embodiment, the electrophoretic display apparatus includes a second substrate that interposes the electrophoretic layer between the first substrate and the second substrate. The refractive index variation layer may be provided on the second substrate on a side opposite to the electrophoretic layer.

In the electrophoretic display apparatus, since the refractive index variation layer is arranged on the second substrate, it is possible to prevent the second substrate from being damaged or the like.

According to this embodiment, the refractive index variation layer may include a refractive index anisotropic material which has a refractive index anisotropy.

In the electrophoretic display apparatus, light from the electrophoretic layer may be securely bent, and thus it is possible to efficiently take light to the outside.

According to this embodiment, the refractive index anisotropic material may be a discotic liquid crystal.

In the electrophoretic display apparatus, it is possible to cause light from the electrophoretic layer to be effectively refracted using the discotic liquid crystal and to be bent in the normal line direction.

According to another embodiment, an electrophoretic display apparatus includes a first substrate, an electrophoretic layer that is arranged on one surface side of the first substrate, and a light guide member that is arranged on the electrophoretic layer on a side opposite to the first substrate, and configured to emit light from the electrophoretic layer along a thickness direction of the electrophoretic layer.

In the electrophoretic display apparatus according to this embodiment, it is possible to take light at greater than the critical angle in light scattered in the electrophoretic layer to the outside in the normal line direction (thickness direction of the electrophoretic layer) using the light guide member. Therefore, it is possible to reduce light which is totally reflected and radiates adjacent pixels when the light guide member is not provided. Therefore, display irregularity due to optical crosstalk may be prevented from occurring and it is possible to perform display with a higher quality.

According to another embodiment, there is provided an electronic apparatus including the electrophoretic display apparatus according to at least one previously described embodiment.

In the electronic apparatus according to this embodiment, the electrophoretic display apparatus is included, with the result that display irregularity may be prevented in the electronic apparatus itself and thus perform display with a higher quality.

BRIEF DESCRIPTION OF THE DRAWINGS

Non-limiting and non-exhaustive embodiments of the present disclosure will be described with reference to the accompanying drawings, wherein like numbers reference like elements.

DESCRIPTION OF EXEMPLARY EMBODIMENTS

Hereinafter, an electrophoretic display apparatus and an electronic apparatus according to embodiments of the disclosure will be described with reference to the accompanying drawings. It is to be understood, however, that other embodiments may be utilized and changes may be made without departing from the scope of the present disclosure. Therefore, the following detailed description is not to be taken in a limiting sense, and the scope of the present disclosure is defined by the appended claims and their equivalents.

For ease in understanding, some sections of the drawings referred to in the description below are enlarged and shown for convenience, and the ratio of the dimension of each component or the like is not limited to the actual dimension.

Figure 1:
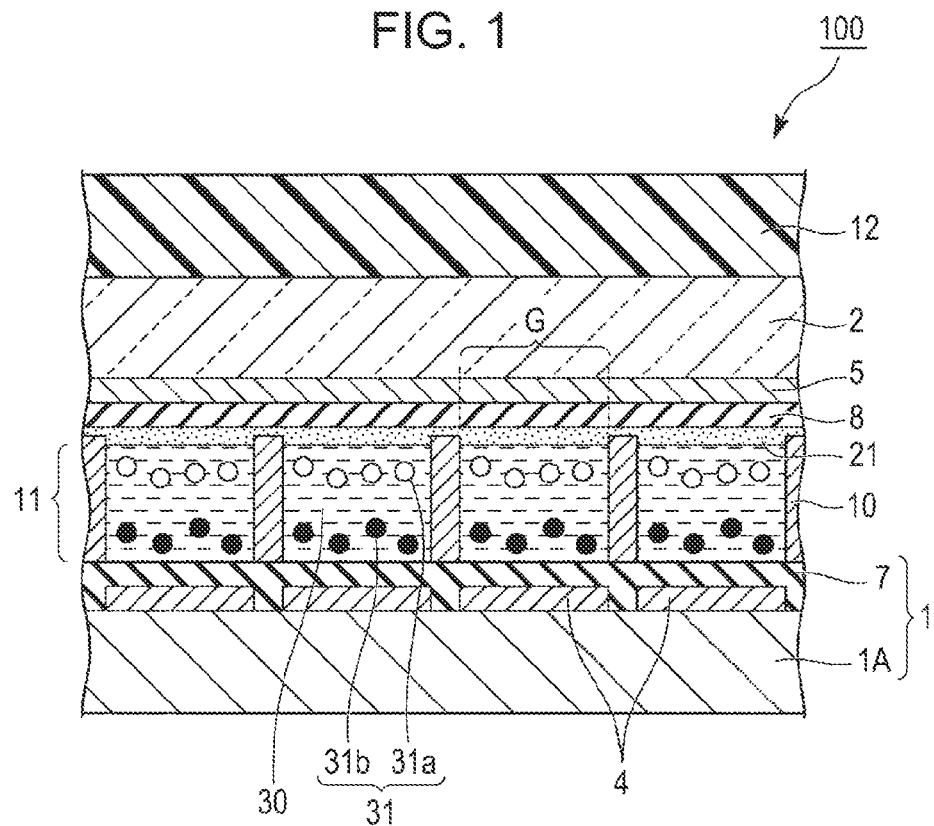
FIG. 1 is a cross-sectional diagram illustrating the schematic configuration of an electrophoretic display apparatus according to at least one embodiment.

FIG. 1 is a cross-sectional diagram illustrating the schematic configuration of an electrophoretic display apparatus according to a first embodiment. As shown in FIG. 1, an electrophoretic display apparatus 100 includes an element substrate 1, a counter substrate 2, and an electrophoretic layer 11 which is arranged between the element substrate 1 and the counter substrate 2.

The element substrate (first substrate) 1 includes a substrate material 1A, pixel electrodes (first electrodes) 4 which are provided on a side of the electrophoretic layer 11 of the substrate material 1A, and a first insulation film 7 which covers the pixel electrodes 4. The substrate material 1A is a substrate which is formed of glass, plastic, or the like, and may not be transparent because the substrate material 1A is arranged on a side opposite to the image display surface. The pixel electrodes 4 are acquired by laminating a nickel plate and a metal plate on a Cu foil in this order, and correspond to electrodes which are formed by Al, Indium Tin Oxide (ITO), or the like. Although not shown in the drawing, scan lines, data lines, selection transistors, and the like are formed between the pixel electrodes 4 and the substrate material 1A.

The counter substrate (second substrate) 2 is formed of a transparent substrate material, such as glass or plastic, and is arranged on a side of the image display. A planar-shaped common electrode 5, which faces the plurality of pixel electrodes 4, is formed on the side of the electrophoretic layer 11 of the counter substrate 2. The entire surface of the common electrode 5 is covered by a second insulation film 8. The common electrode 5 is a transparent electrode which is formed of MgAg, ITO, IZO (indium/zinc oxide), or the like.

The electrophoretic layer 11 is filled in spaces which are divided by a first insulation film 7 which is provided on an inner surface side of the element substrate 1, a second insulation film 8 which is provided on an inner surface side of the counter substrate 2, and the walls 10 which are provided between the first insulation film 7 and the second insulation film 8. The walls 10 perform division on pixels G which are provided to correspond to the respective pixel electrodes 4, and are formed of a transparent material (an acryl or epoxy resin or the like).

The thickness of the walls 10 is, for example, 30 μm. Meanwhile, a junction layer 21 is provided between the upper sides of the walls 10 and the second insulation film 8. The junction layer 21 is provided to connect the counter substrate 2 to the element substrate 1 on which the walls 10 are formed. The junction layer 21 is formed of, for example, a transparent resin, and the upper sides of the walls 10 are encroached by the junction layer 21. The thickness of the junction layer 21 may be to an extent which does not hinder an electric field, and may be, for example, 2 μm to 6 μm. In addition, the amount of the walls 10 which are encroached by the junction layer 21 may be, for example, 0.5 μm to 1 μm.

The electrophoretic layer 11 includes a plurality of electrophoretic particles 31 which are dispersed in a dispersion medium 30. In the embodiment, the electrophoretic particles 31 include, for example, white particles 31a and black particles 31b.

The white particles 31a are particles (polymer or colloid) which are formed of, for example, a white pigment, such as titanium dioxide, zinc oxide, or antimony trioxide, and are, for example, negatively charged and used. The black particles 31b are particles (polymer or colloid) which are formed of, for example, a black pigment, such as aniline black or carbon black, and are, for example, positively charged and used. If necessary, it is possible to add dispersing agents, lubricants, stabilizing agents, and the like, such as charge control agents, titanium-coupling agents, aluminate coupling agents, and silane-based coupling agents which include particles, such as an electrolyte, a surfactant, a metallic soap, resin, gum, oil, varnish, and compound, to the pigments.

In addition, instead of the white particles 31a and the black particles 31b, for example, the pigments of a red color, a green color, a blue color may be used. According to the configuration, it is possible to provide the electrophoretic display apparatus 100 capable of performing color display by displaying the red color, the green color, the blue color, and the like.

As the dispersion medium 30, it is possible to use water, alcohol-based solvent (methanol, ethanol, isopropanol, butanol, octanol, methyl cellosolve, or the like), ester (ethyl acetate, butyl acetate, or the like), ketone (acetone, methyl ethyl ketone, methyl isobutyl ketone, or the like), aliphatic hydrocarbon (pentane, hexane, octane, or the like), alicyclic hydrocarbon (cyclohexane, methyl cyclohexane, or the like), aromatic hydrocarbon (benzenes having a group of benzene, toluene, xylene, and lone chain alkyl (hexyl benzenes, heptyl benzenes, octyl benzenes, nonyl benzenes, decyl benzenes, undecyl benzenes, dodecyl benzenes, tridecyl benzenes, tetradecyl benzenes, or the like)), halogenated hydrocarbon (methyl chlorides, chloroform, carbon tetrachloride, 1,2-dichloroethane, or the like), or the like, and other oils may be used. It is possible to use the substances separately or as a mixture, and, further, a surfactant, such as carboxylate, may be compounded therewith.

Based on the configuration, in the electrophoretic display apparatus 100, for example, when a voltage is applied between the pixel electrodes 4 and the common electrode 5, the electrophoretic particles 31 (the white particles 31a and the black particles 31b) are electrically migrated toward any of the electrodes (the pixel electrodes 4 or the common electrode 5) according to an electric field which is generated between the pixel electrodes 4 and the common electrode 5. For example, if the pixel electrodes 4 are set to negative potential when the white particles 31a have positive charge, the white particles 31a move and gather on the sides of (lower sides) the pixel electrodes 4, and the black color is displayed.

However, when a certain pixel (target pixel) is focused on in the general electrophoretic display apparatus, the colors of peripheral pixels, that is, the brightness of the target pixel changes due to reflectance, and thus there is a problem in that display irregularity is generated.

Figure 2:
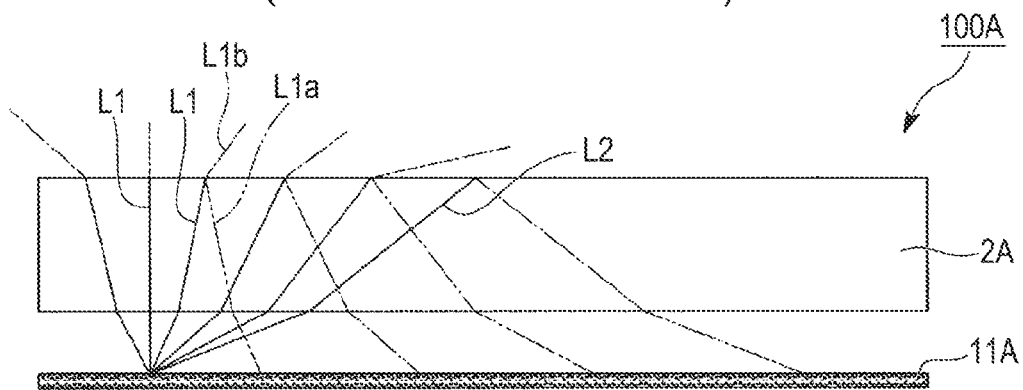
FIG. 2 is a schematic cross-sectional diagram illustrating a phenomenon which is generated in an electrophoretic display apparatus according to conventional art.

FIG. 2 is a schematic cross-sectional diagram illustrating a phenomenon which is generated in a general electrophoretic display apparatus 100A according to the related art.

As shown in FIG. 2, in the electrophoretic display apparatus 100A, light from the outside, which is incident from a side of a counter substrate 2A which is a display surface, is scattered and reflected in the electrophoretic layer 11A. Light which is scattered and reflected in the electrophoretic layer 11A is incident into the counter substrate 2A again, some light L1a of light L1 having an angle, which is less than a critical angle, is reflected in the boundary surface between the counter substrate 2A and air and returns to the inside, some remaining light L1b is emitted from the display surface as image light. In contrast, light L2 having an angle, which is equal to or greater than the critical angle, is totally reflected and is radiated in the electrophoretic layer 11A again.

In the electrophoretic display apparatus 100A described above, for example, a percentage of light reflected in the electrophoretic layer 11A that is directly emitted from the display surface is approximately 38%, and a percentage of light that is returned to the inside of the display surface is approximately 62%. Meanwhile, light which returns to the inside of the display surface is repeatedly reflected in the electrophoretic layer 11A again.

Light emitted from some spots of the electrophoretic layer 11A returns to other spots of the electrophoretic layer 11A. That is, it is possible to say that 62% of the brightness corresponding to some of the electrophoretic layer 11A is from the reflection light of remaining electrophoretic layer 11A.

Here, when it is assumed that the reflectance of the electrophoretic layer 11 is $R_p$ and the light emission rate of light from the display surface (that is, the reflectance of the electrophoretic layer 11 over the counter substrate 2) is $R_{obs}$, the following Expression (1) is defined:

$$R_{obs}=0.95(0.38R_p/(1-0.62R_p)) \quad (1)$$

Meanwhile, 0.95 which is the first term on the right side of the Expression (1) is acquired by taking reflectance of incident light on the surface of the counter substrate 2 into consideration.

Figure 3:
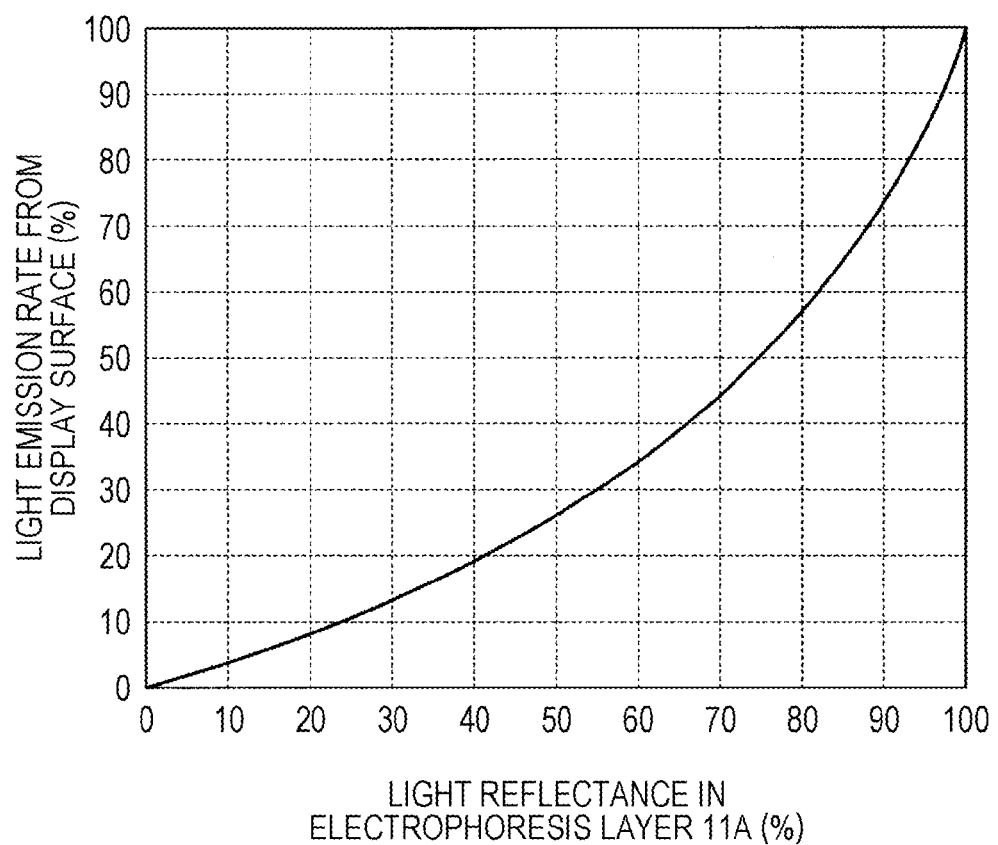
FIG. 3 is a graph illustrating an Equation 1.

FIG. 3 is a graph illustrating the Expression (1). Meanwhile, in FIG. 3, a horizontal axis indicates the reflectance $R_p$ of the electrophoretic layer 11A and a vertical axis indicates a rate of emission of light $R_{obs}$ from the display surface.

As shown in FIG. 3, if the reflectance $R_p$ of the electrophoretic layer 11A falls, the rate of emission of light from the display surface is rapidly lowered. The reason for this may be that reflection of light from another position decreases as much as the reflectance $R_p$. That is, if the peripheral pixels of a pixel, which is a target (hereinafter, called a target pixel), are black, the amount of light which is radiated in the target pixel decreases, and thus the target pixel becomes dark. However, if the peripheral pixels of the target pixel are white, the amount of light which is radiated to the target pixel increases, and thus the target pixel becomes bright. That is, information in which optical crosstalk generates the display irregularity is acquired.

Based on the information, the electrophoretic display apparatus 100 according to an embodiment includes an optical element (refractive index variation layer) 12 which is arranged in the counter substrate 2 on a side opposite to the electrophoretic layer 11. As the optical element 12, for example, an element in which a material, such as a liquid crystal, having dielectric anisotropy is disposed such that permittivity gradually changes in a normal line direction of the display surface of the electrophoretic display apparatus 100 is used. Here, since the refractive index of a transparent member which does not have magnetism is proportional to the square root of the permittivity, the optical element 12 changes such that the refractive index in the normal line direction gradually increases while receding from the electrophoretic layer 11.

Figure 4:
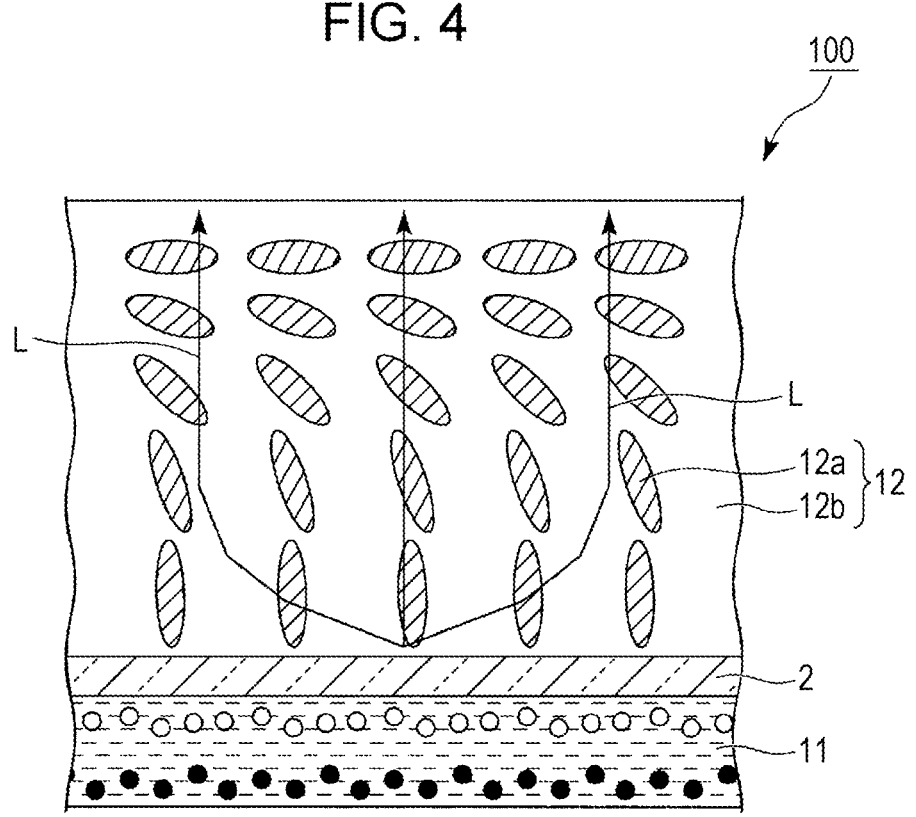
FIG. 4 is a cross-sectional diagram illustrating the schematic configuration of an optical element.

FIG. 4 is a cross-sectional diagram illustrating the schematic configuration of the optical element 12. Meanwhile, the common electrode 5, the second insulation film 8, the junction layer 21, and the walls 10 which are not related to the description are not shown in FIG. 4. As shown in FIG. 4, the optical element 12 according to an embodiment is formed of a liquid crystal plate that includes a substrate material 12b and a plurality of discotic liquid crystal molecules 12a which are arranged in a predetermined oriented state in the substrate material 12b. In the optical element 12, the oriented state of the plurality of discotic liquid crystal molecules 12a changes such that the refractive index gradually increases while receding from the electrophoretic layer 11. More specifically, the discotic liquid crystal molecules 12a are vertically oriented on a side of the electrophoretic layer 11 and are horizontally oriented while receding from the electrophoretic layer 11.

The substrate material 12b is formed of, for example, a transparent substrate material such as acryl. In at least one embodiment, a material which has substantially the same refractive index as the counter substrate 2 is used as the substrate material 12b. According to this, it is possible to prevent light, which is reflected in the electrophoretic layer 11, from reflecting in the boundary surface between the substrate material 12b and the counter substrate 2.

In addition, in the embodiment, the refractive index of the optical element 12 continuously changes.

According to an embodiment, when light which is scattered in the electrophoretic layer 11 passes through the optical element 12 on the counter substrate 2, the refractive index continuously increases while receding from the electrophoretic layer 11. Therefore, light L of scattered light, which is incident to the optical element 12 from directions other than the normal line direction, is bent in the normal line direction while passing through the optical element 12. As above, when light L from the electrophoretic layer 11 is effectively bent, it is possible to efficiently take light to the outside.

As such, it is possible to cause an incident angle of light which is scattered in the electrophoretic layer 11 with regard to a light emission surface to be greater than a critical angle. That is, when the optical element 12 is provided, it is possible to relieve a condition for total reflection of scattered light due to the electrophoretic layer 11. Therefore, it is possible to suppress scattered light which affects the display of other pixels because the scattered light is reflected in the surface of the counter substrate 2 when the optical element 12 is not provided.

Therefore, it is possible to reduce the percentage in which most of the reflection light of a certain pixel, which is generated in the general electrophoretic display apparatus 100 as described above due to the electrophoretic layer 11, radiates other pixels. In other words, when the optical element 12 is provided, it is possible to reduce reflection light from other pixels, and thus it is possible to prevent the brightness of the target pixel from being affected even when the display state (reflectance) of the peripheral pixels of the target pixel changes.

Since it is possible to reduce the above-described optical crosstalk, display irregularity may be prevented from being generated, and it is possible to perform display with a higher quality.

In addition, in an embodiment, the refractive index of the optical element 12 continuously changes, and thus a boundary surface is not generated in the optical element 12. Therefore, light is not reflected in the boundary surface in the optical element 12. Therefore, the scattered light in the electrophoretic layer 11 can pass through the inside of the optical element 12 and effectively taken to the outside.

In addition, in an embodiment, the counter substrate 2 is covered by the optical element 12, and thus it is possible to prevent the counter substrate 2 from being damaged or the like.

In the electrophoretic display apparatus 100 according to an embodiment described above, optical crosstalk is may be prevented from occurring by arranging the optical element 12, which causes scattered light from the electrophoretic layer 11 to be bent in a direction in which the viewing angle narrows, on the side of the display surface.

That is, the liquid crystal plate, which is included in the optical element 12, causes liquid crystal molecules to be horizontally oriented on the inside (side of the electrophoretic layer 11) and then transfers the liquid crystal molecules to be vertically oriented on a side of the boundary surface of the air (while receding from the electrophoretic layer 11) similarly to a viewing angle compensation film of a liquid crystal display apparatus, and thus the liquid crystal plate is used for totally reverse use compared to the case in which the viewing angle is enlarged. An electrophoretic display apparatus according to another embodiment will be described. At least one embodiment described above is different from this embodiment in that the optical element 12 in which the refractive index gradually changes is shown as an example of a section which relieves a condition for total reflection in the above described embodiment but a light guide member, which leads light from the electrophoretic layer in the thickness direction of the electrophoretic layer and emits light, is used in an embodiment. The same reference numerals are attached to the same members in this embodiment, and the description thereof is not repeated.

Figure 5:
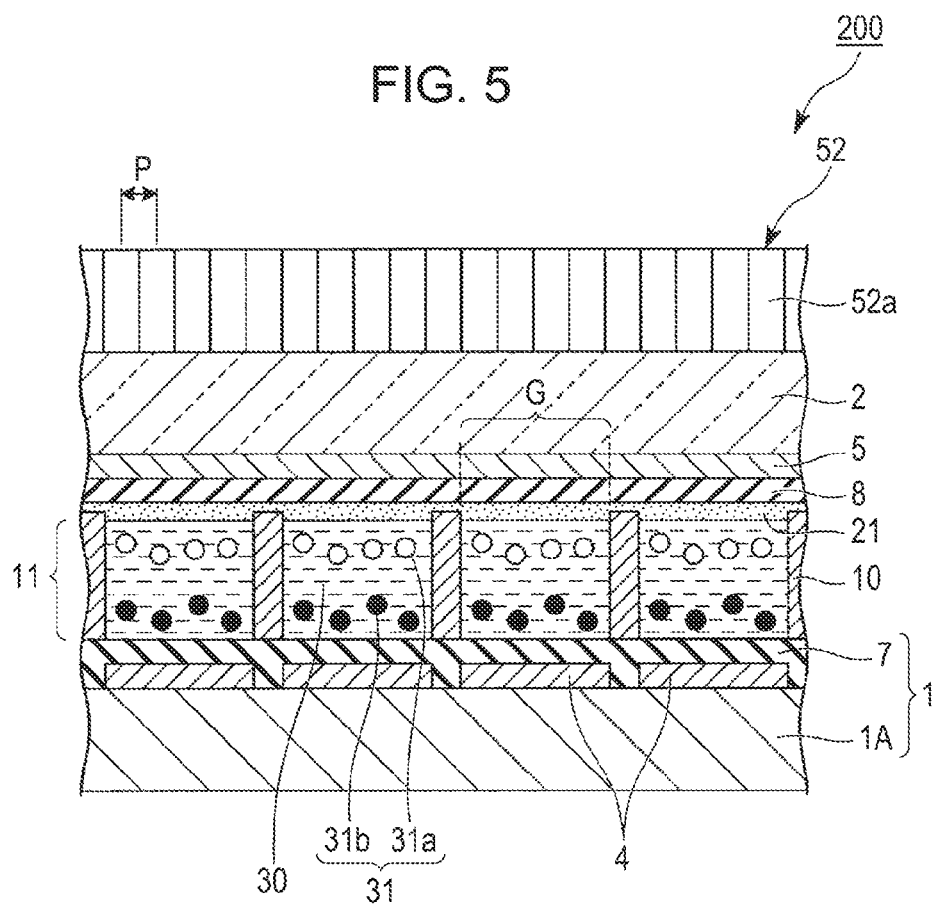
FIG. 5 is a cross-sectional diagram illustrating the schematic configuration of an electrophoretic display apparatus according to another embodiment.

FIG. 5 is a cross-sectional diagram illustrating the schematic configuration of the electrophoretic display apparatus according to an embodiment. As shown in FIG. 5, an electrophoretic display apparatus 200 includes an element substrate 1, a counter substrate 2, and an electrophoretic layer 11 which is arranged between the element substrate 1 and the counter substrate 2.

The electrophoretic display apparatus 200 according to an embodiment includes a fiber plate (light guide member) 52 which is arranged on the counter substrate 2 on a side opposite to the electrophoretic layer 11.

The fiber plate 52 is configured to include a plurality of bundled optical fibers 52a, in which a refractive index at a central part is greater than a refractive index at a peripheral part, with a predetermined pitch P.

Figure 6:
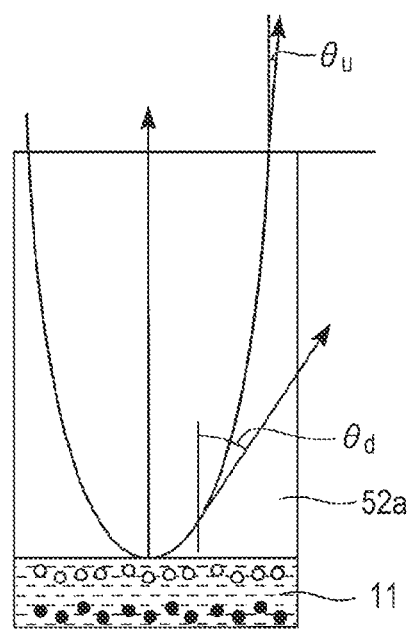
FIG. 6 is an explanatory diagram illustrating arrangement pitch of an optical fiber on a fiber plate.

FIG. 6 is a diagram illustrating an arrangement pitch (hereinafter, simply referred to as a pitch P) between the optical fibers 52a in the fiber plate 52. As shown in FIG. 6, the pitch P in the fiber plate 52 may be set such that an angle $\theta_u$, which is a normal line of a light emission surface when light is emitted, is equal to or less than a critical angle $\theta_c$. More specifically, when the thickness of the fiber plate 52 is t, P is set such that P is equal to or less than $2t\tan\theta_c$. Here, the critical angle $\theta_c$ is defined to be an angle which satisfies $1/n=\sin\theta_c$ when it is assumed that a refractive index of the counter substrate 2 is n.

Further, an angle of light which passes through the fiber plate 52 may be equal to or less than the critical angle $\theta_c$ on at least the upper surface of the fiber plate 52. Therefore, an angle $\theta_d$ of light on the lower side of the fiber plate 52 may be greater than the critical angle $\theta_c$.

According to an embodiment, scattered light which is scattered in the electrophoretic layer 11 passes through each of the optical fibers 52a of the fiber plate 52 on the counter substrate 2, and thus the scattered light is bent in the normal line direction and then emitted. As above, in an embodiment, it is possible to cause the incident angle of light, which is scattered in the electrophoretic layer 11, with regard to the light emission surface, to be greater than the critical angle. That is, when the fiber plate 52 is provided, the condition for total reflection of scattered light due to the electrophoretic layer 11 is relieved, with the result that light is totally reflected in the counter substrate 2, and thus it is possible to suppress light components which contribute to display of other pixels.

In an embodiment, the above-described optical crosstalk is reduced, with the result that display irregularity may be prevented from occurring, and thus it is possible to perform display with a higher quality.

Meanwhile, in an embodiment, a case in which the plurality of optical fibers 52a are arranged with regard to one pixel G is shown as an example. However, the embodiments are not limited thereto. One optical fiber 52a may be arranged with regard to a plurality of pixels G.

In addition, the disclosure is not necessarily limited to the embodiments described herein, and various modifications can be added in the range without departing from the gist of the disclosure.

Figure 7:
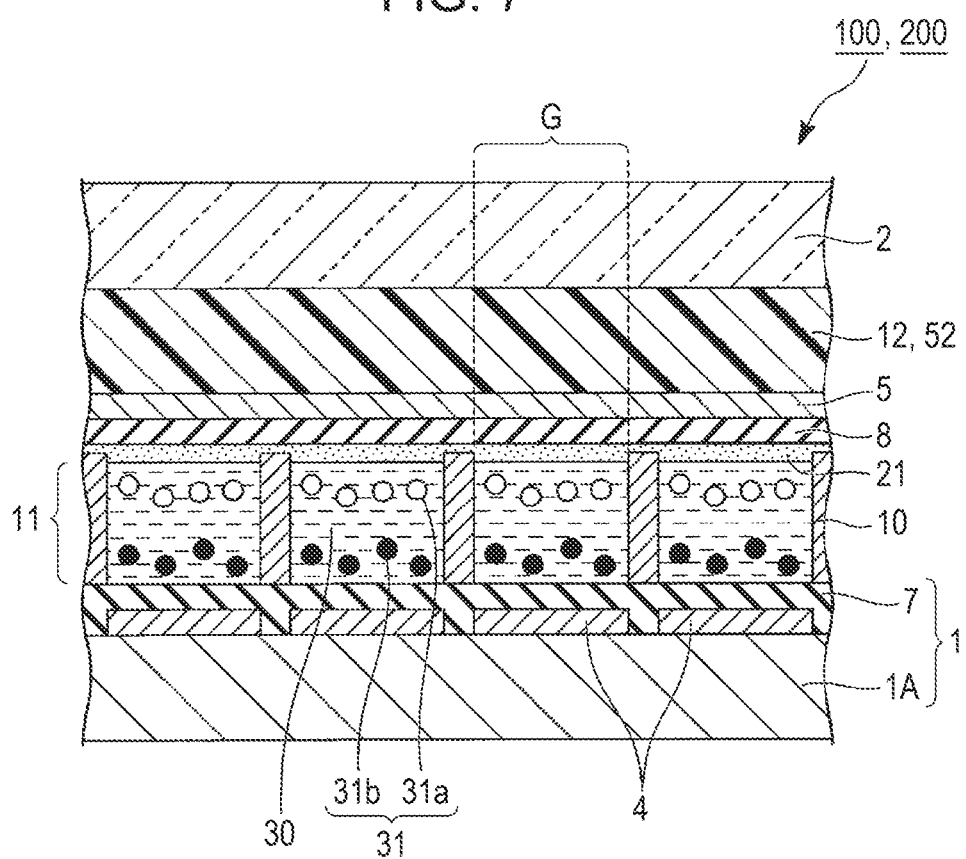
FIG. 7 is a diagram illustrating the schematic configuration of an electrophoretic display apparatus according to another embodiment.

For example, in embodiments, a case in which the optical element 12 or the fiber plate 52 is provided on the outside (on the side opposite to the electrophoretic layer 11) of the counter substrate 2 is shown as an example. However, the disclosure is not limited thereto. As shown in FIG. 7, the optical element 12 or the fiber plate 52 may be provided on the inner side of the counter substrate 2. As such, it is possible to cause scattered light from the electrophoretic layer 11 to be efficiently incident to the optical element 12 or the fiber plate 52. According to at least one embodiment, only the optical element 12 or the fiber plate 52 may be provided instead of the counter substrate 2. In this case, the optical element 12 or the fiber plate 52 has the function as the counter substrate 2, and thus it is possible to achieve a thin electrophoretic display apparatus.

A case in which the electrophoretic display apparatus of each of the above described embodiments is applied to an electronic apparatus will be described.

Figure 8A:
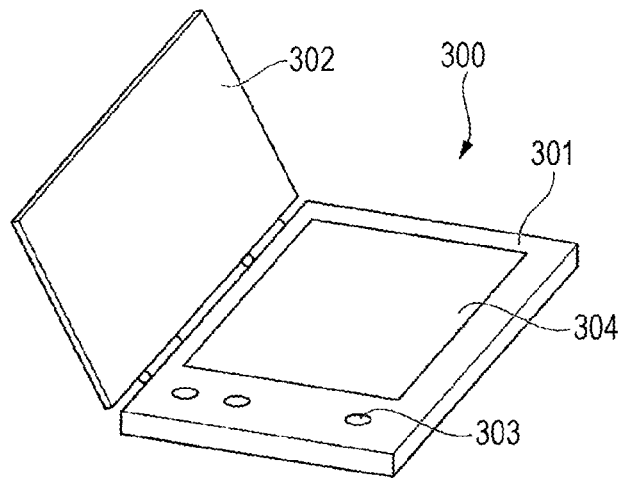
FIG. 8A is a perspective diagram illustrating an electronic book as an example of an electronic apparatus.
Figure 8B:
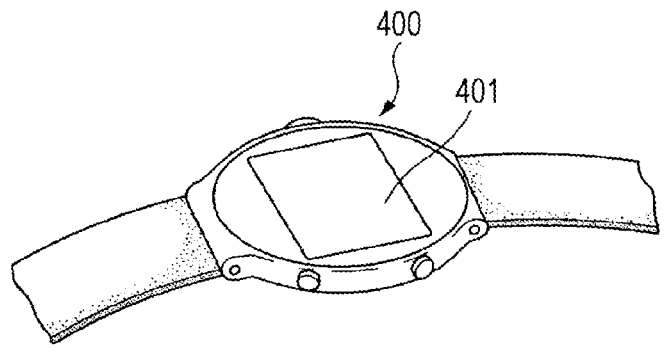
FIG. 8B is a perspective diagram illustrating a wristwatch as an example of an electronic apparatus.
Figure 8C:
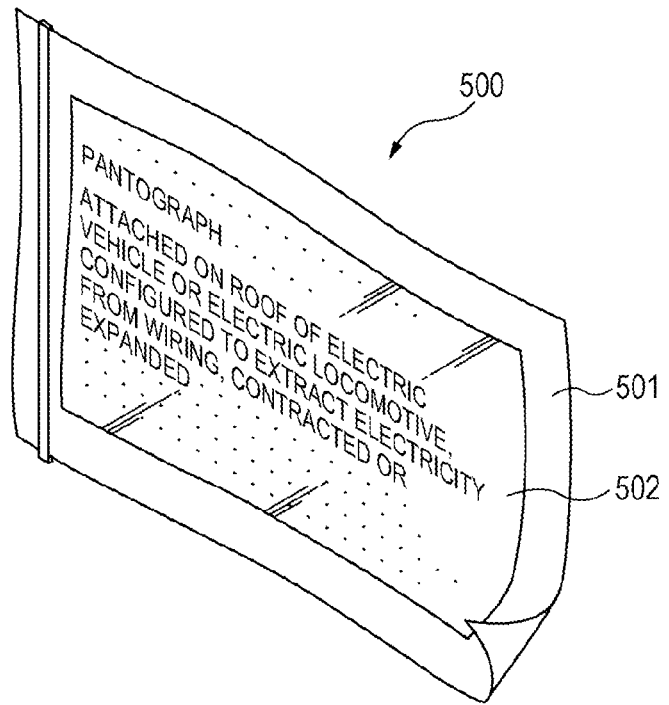
FIG. 8C is a perspective diagram illustrating an electronic paper as an example of an electronic apparatus.

FIGS. 8A to 8C are perspective diagrams illustrating detailed examples of an electronic apparatus to which the electrophoretic display apparatus according to the embodiments are applied.

FIG. 8A is a perspective diagram illustrating an electronic book which is an example of an electronic apparatus. An electronic book (electronic apparatus) 300 includes a frame 301 which has a book shape, a cover 302 which is provided to be rotatable (openable) with regard to the frame 301, and operation section 303, and a display unit 304 which includes the electrophoretic display apparatus according to the disclosure.

FIG. 8B is a perspective diagram illustrating a wristwatch which is an example of the electronic apparatus. A wristwatch (electronic apparatus) 400 includes a display unit 401 which includes the electrophoretic display apparatus according to the disclosure.

FIG. 8C is a perspective diagram illustrating electronic paper which is an example of an electronic apparatus. Electronic paper (electronic apparatus) 500 includes a main body section 501 which includes a rewritable sheet having the same texture and flexibility as paper, and a display unit 502 which includes the electrophoretic display apparatus according to the disclosure.

Since an electronic book, an electronic paper, or the like is used to repeatedly write letters on a white background, it is important to solve the problems of display irregularity.

Further, the range of electronic apparatus to which the electrophoretic display apparatus according to the disclosure can be applied is not limited thereto, and widely includes an apparatus which uses change in color tone in sight in accordance with the movement of charged particles.

According to the above-described electronic book 300, the wristwatch 400, and the electronic paper 500, the electrophoretic display apparatus according to the disclosure is used, with the result that display irregularity may be suppressed, thereby resulting in a high-grade electronic apparatus which can acquire display characteristics with a higher quality and which has higher reliability.

Also, the electronic apparatus is an example of the electronic apparatus according to the disclosure, and does not limit the technical range of the disclosure. For example, the electrophoretic display apparatus according to the disclosure may be appropriately used for a display unit of an electronic apparatus, such as a mobile phone or a portable audio device, a business sheet such as a manual, a text book, a workbook, an information sheet, and the like.

The preceding is merely a description of several embodiments. While specific embodiments and applications have been illustrated and described, it is to be understood that the precise configuration and components disclosed herein is illustrative only. Having the benefit of this disclosure, various modifications, changes, and variations will be apparent to those of ordinary skill in the art without departing from the spirit and scope of the principles disclosed. Thus, to the maximum extent allowed by law, the scope of the invention is to be determined by the broadest permissible interpretation of the following claims and their equivalents.

What is claimed is:

1. An electrophoretic display apparatus comprising:
a first substrate;
a refractive index variation layer having a refractive index, the refractive index variation layer arranged so as to oppose the first substrate; and
an electrophoretic layer arranged between the first substrate and the refractive index variation layer,
wherein the refractive index of the refractive index variation layer increases as it recedes away from the electrophoretic layer in a thickness direction of the electrophoretic layer.

2. The electrophoretic display apparatus according to claim 1, wherein the refractive index in the refractive index variation layer continuously changes along the thickness direction.

3. The electrophoretic display apparatus according to claim 1, wherein the refractive index gradually increases as it recedes away from the electrophoretic layer.

4. The electrophoretic display apparatus according to claim 1, further comprising:
a second substrate, wherein the refractive index variation layer is disposed between the electrophoretic layer and the second substrate.

5. The electrophoretic display apparatus according to claim 1, further comprising:
a second substrate that is disposed between the electrophoretic layer and the refractive index variation layer.

6. The electrophoretic display apparatus according to claim 5,
wherein: the refractive index variation layer comprises a substrate material and a plurality of discotic liquid crystal molecules arranged in a predetermined oriented state in the substrate material, and
the refractive index of the refractive index variation layer is substantially the same as a refractive index of the second substrate.

7. The electrophoretic display apparatus according to claim 1, wherein the refractive index variation layer includes a refractive index anisotropic material which has a refractive index anisotropy.

8. The electrophoretic display apparatus according to claim 7, wherein the refractive index anisotropic material is a discotic liquid crystal.

9. The electrophoretic display apparatus according to claim 8, wherein the discotic liquid crystal includes molecules and the molecules are vertically oriented near the electrophoretic layer and are horizontally oriented in the thickness direction away from the electrophoretic layer.

10. An electrophoretic display apparatus according to claim 1, further comprising:
a common electrode arranged between the refractive index variation layer and the electrophoretic layer,
wherein the first substrate is arranged opposite to an image display surface and includes pixel electrodes facing the common electrode.

11. An electronic apparatus comprising the electrophoretic display apparatus according to claim 1.

12. An electrophoretic display apparatus comprising:
a first substrate;
a light guide member arranged so as to oppose the first substrate; and
an electrophoretic layer arranged between the first substrate and the light guide member,
wherein the light guide member is configured to pass a light reflected in the electrophoretic layer in a thickness direction of the electrophoretic layer.

13. The electrophoretic display apparatus according to claim 12, wherein the light guide member comprises a plurality of bundled optical fibers.

14. The electrophoretic display apparatus according to claim 13, wherein a refractive index at a central part of each of the plurality of bundled optical fibers is greater than a refractive index at a peripheral part of each of the plurality of bundled optical fibers.

15. The electrophoretic display apparatus according to claim 12, further comprising:
   a second substrate, wherein the light guide member is disposed between the electrophoretic layer and the second substrate.

16. The electrophoretic display apparatus according to claim 12, further comprising:
   a second substrate that is disposed between the electrophoretic layer and the light guide member.

17. An electronic apparatus comprising the electrophoretic display apparatus according to claim 12.

* * * * *